(12) United States Patent
Wu

(10) Patent No.: US 9,074,668 B2
(45) Date of Patent: Jul. 7, 2015

(54) ELECTRIC ACTUATOR AND FAST RELEASING MECHANISM THEREOF

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

(*) Notice: Subject to any disclaimer, the term of this patent is extended or adjusted under 35 U.S.C. 154(b) by 396 days.

(21) Appl. No.: 13/766,573

(22) Filed: Feb. 13, 2013

(65) Prior Publication Data

US 2014/0182405 A1 Jul. 3, 2014

(30) Foreign Application Priority Data

Dec. 27, 2012 (TW) .............. 101225250 U

(51) Int. Cl.
*F16H 25/20* (2006.01)
*A63B 21/005* (2006.01)
*A61G 7/018* (2006.01)
*A61G 5/10* (2006.01)
*A63B 22/02* (2006.01)

(52) U.S. Cl.
CPC ........... *F16H 25/20* (2013.01); *Y10T 74/18648* (2015.01); *A61G 7/018* (2013.01); *F16H 2025/2065* (2013.01); *F16H 2025/2071* (2013.01); *F16H 2025/2037* (2013.01); *A61G 5/1056* (2013.01); *A63B 21/0058* (2013.01); *A63B 22/0235* (2013.01)

(58) Field of Classification Search
CPC .............. Y10T 74/18648; F16H 25/20; F16H 2025/2071; F16H 2025/2065; F16H 2025/2037; A61G 7/018; A61G 5/1056; A63B 21/0058

See application file for complete search history.

(56) References Cited

U.S. PATENT DOCUMENTS

| | | | | | |
|---|---|---|---|---|---|
| 3,977,262 | A | * | 8/1976 | Randolph ................... | 74/89.36 |
| 8,186,236 | B2 | * | 5/2012 | Lorenzen .................... | 74/89.38 |
| 8,397,594 | B2 | * | 3/2013 | Ou et al. ..................... | 74/89.23 |
| 2010/0147091 | A1 | * | 6/2010 | Buttiker ...................... | 74/89.32 |
| 2013/0220042 | A1 | * | 8/2013 | Yokoyama et al. ......... | 74/89.32 |
| 2014/0174224 | A1 | * | 6/2014 | Zhang ......................... | 74/89.32 |
| 2014/0182405 | A1 | * | 7/2014 | Wu .............................. | 74/89.32 |
| 2014/0245847 | A1 | * | 9/2014 | Eriksson ..................... | 74/89.32 |
| 2014/0298933 | A1 | * | 10/2014 | Kohlmeyer et al. ........ | 74/89.32 |
| 2014/0326091 | A1 | * | 11/2014 | Evans ......................... | 74/89.32 |

* cited by examiner

*Primary Examiner* — David M Fenstermacher
(74) *Attorney, Agent, or Firm* — Chun-Ming Shih; HDLS IPR Services

(57) ABSTRACT

In an electric actuator (100), a fast releasing mechanism (30) includes a rotary base (31), a coupling ring (32), a sleeve (34), and a clutch device (36). The coupling ring (32) rotates with the rotary base (31). Locking slots (322) are disposed on the coupling ring (32). The rotary base (31) can rotate with respect to the sleeve (34). Chain slots (343) communicating with the locking slots (322) are disposed on the sleeve (34). The clutch device (36) is correspondingly sleeved around the sleeve (34). Raised ribs (361) slidably connected to the locking slots (322) and the chain slots (343) are disposed on the clutch device (36). The sleeve (34) can be selected to move together with or move separately with the rotary base (31) by means of the axial movement of the clutch device (36).

20 Claims, 12 Drawing Sheets

ELECTRIC ACTUATOR AND FAST RELEASING MECHANISM THEREOF

BACKGROUND OF THE INVENTION

1. Field of the Invention

The present invention relates to an electric actuator and in particular to an electric actuator with a fast releasing mechanism.

2. Description of Related Art

The electric actuator, which has been used in the electric hospital bed, treadmill, wheelchair, and the like for adjustments of position levels and elevation angles, has considerably common and wide applications.

A traditional electric actuator includes an external tube in which an actuating shaft is disposed. The actuating shaft is hollow and a screw is disposed therein. One end of the actuating shaft is engaged with the tread of the screw. A motor disposed in the electric actuator connects and rotates the screw axis. That is, as the screws axis rotates, the actuating shaft axis is driven to move.

However, taking an electric actuator for the adjustment of the hospital bed as an example, the screw is driven by the motor and then can lift the hospital bed up and down. When the emergency event occurs, the hospital bed can not recover the original position rapidly, affecting patient's precious time. Thus, how to make the electric actuator be adjusted rapidly is the key issue of the present invention.

In view of this, the inventor pays special attention to research with the application of related theory and tries to overcome the above disadvantages regarding the above related art, which becomes the goal of the inventor's improvement.

SUMMARY OF THE INVENTION

The present invention is to provide an electric actuator and a fast releasing mechanism thereof, which uses the fast releasing mechanism connected to a non-self locking screw rod to make the electric actuator have the characteristic of rapid position restoration and save the restoration time of the electric actuator.

Accordingly, the present invention provides an electric actuator including:

an actuating mechanism including an actuating shaft and a non-self locking screw rod screwed to the actuating shaft;

a motor connecting and driving the non-self locking screw rod; and a fast releasing mechanism including:

a rotary base, one end thereof being connected to the actuating shaft, the rotary base having a positing post and an axial rod axially extending from the positing post;

a coupling ring correspondingly sleeved around and rotating with the positing post, a plurality of locking slots being disposed on the external peripheral wall of the coupling ring;

a bearing sleeved around the axial rod;

a sleeve sleeved around the axial rod and the bearing, wherein the rotary base rotates with respect to the sleeve and a plurality of chain slots that communicate with the locking slots are disposed on the external peripheral wall the sleeve; and a clutch device correspondingly sleeved around the sleeve and the bearing, wherein a plurality of raised ribs slidably connected to the locking slots and the chain slots are disposed on the internal wall of the clutch device, whereby the sleeve can be selected to move together with or move separately with the rotary base by means of the axial movement of the clutch device.

In another aspect, the present invention provides a fast releasing mechanism for an electric actuator, including:

a rotary based having a positing post and an axial rod axially extending from the positing post;

a coupling ring correspondingly sleeved around and rotating with the positing post, a plurality of locking slots being disposed on the external peripheral wall of the coupling ring;

a bearing sleeved around the axial rod;

a sleeve sleeved around the axial rod and the bearing, wherein the rotary base rotates with respect to the sleeve and a plurality of chain slots that communicate with the locking slots are disposed on the external peripheral wall the sleeve; and a clutch device correspondingly sleeved around the sleeve and the bearing, wherein a plurality of raised ribs slidably connected to the locking slots and the chain slots are disposed on the internal wall of the clutch device, whereby the sleeve can be selected to move together with or move separately with the rotary base by means of the axial movement of the clutch device.

Further, the present invention achieves the following effects,

First, when the clutch device slides away from the rotary base which is in a releasing state for the fast releasing mechanism, one end of each raised rib of the clutch device is completely released out of the corresponding locking slot, resulting in the sleeve being able to rotate with respect to the rotary base. At this moment, the actuating shaft is under compression, the electric actuator can make the actuating shaft move axially with respect to the non-self locking screw rod without through the motor. Accordingly, the electric actuator can perform the rapid position restoration to reduce the time for position restoration of the electric actuator.

Second, the bearing is sleeved around the axial rod and clamped between the sleeve and the rotary base. Balls disposed in the bearing can decrease the rotation resistance caused by the relative rotation of the sleeve to the rotary base.

Third, the fast releasing mechanism further includes an elastic member clamped between the sleeve and the clutch device, whereby when the clutch device slides away from the rotary base, the elastic member pushes against and restores the clutch device toward the rotary base, exerting a steady force on the clutch device. As a result, the fast releasing mechanism stays in a releasing state, and which further increases the operational security or is used to adjust the releasing time of the fast releasing mechanism.

Fourth, the fast releasing mechanism further includes a supporting ring disposed between the axial rod and the sleeve. The outer side of the supporting ring is disposed against the inner wall of the sleeve to support and maintain the coaxial configuration between the axial rod and the sleeve, whereby when the axial rod rotates with respect to the sleeve, the supporting ring can lessen the mutual impact of the axial rod and the sleeve to avoid the deflection or error of the electric actuator movement.

Fifth, the fast releasing mechanism further includes a switch member which can facilitate the switching of locking and releasing performed by the fast releasing mechanism, improving the use convenience.

DETAILED DESCRIPTION OF THE INVENTION

The detailed explanation and technique of the present invention will be described with figures as follows. However, the accompanying figures are only for reference and explanation, not to limit the scope of the present invention.

Please refer to FIGS. 1-5. The present invention provides an electrical actuator and a fast releasing mechanism thereof. The electric actuator 100 mainly includes an actuating mechanism 10, a motor 20, and a fast releasing mechanism 30.

Figure 1:
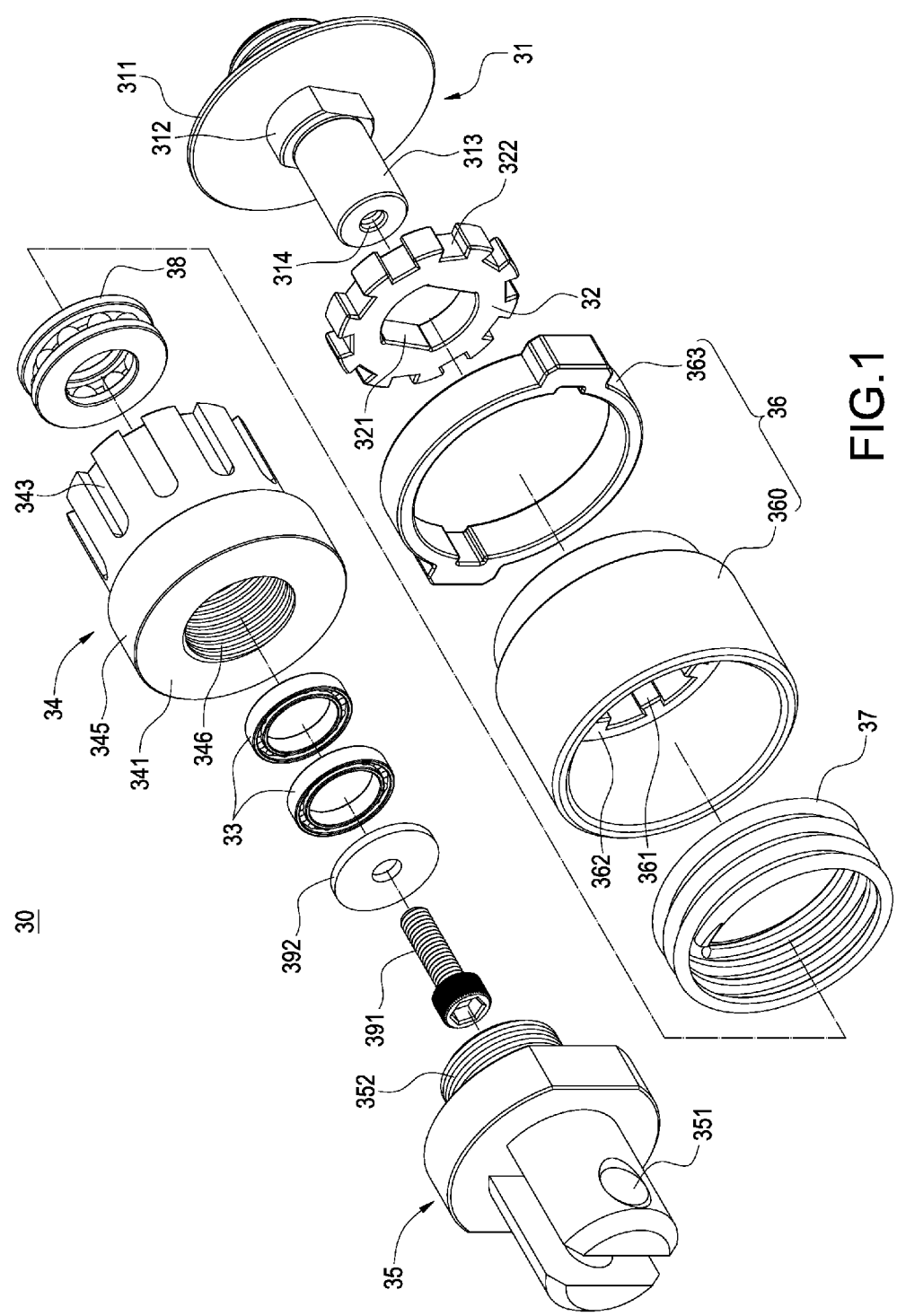
FIG. 1 is an explosive perspective view of the fast releasing mechanism of the present invention.
Figure 2:
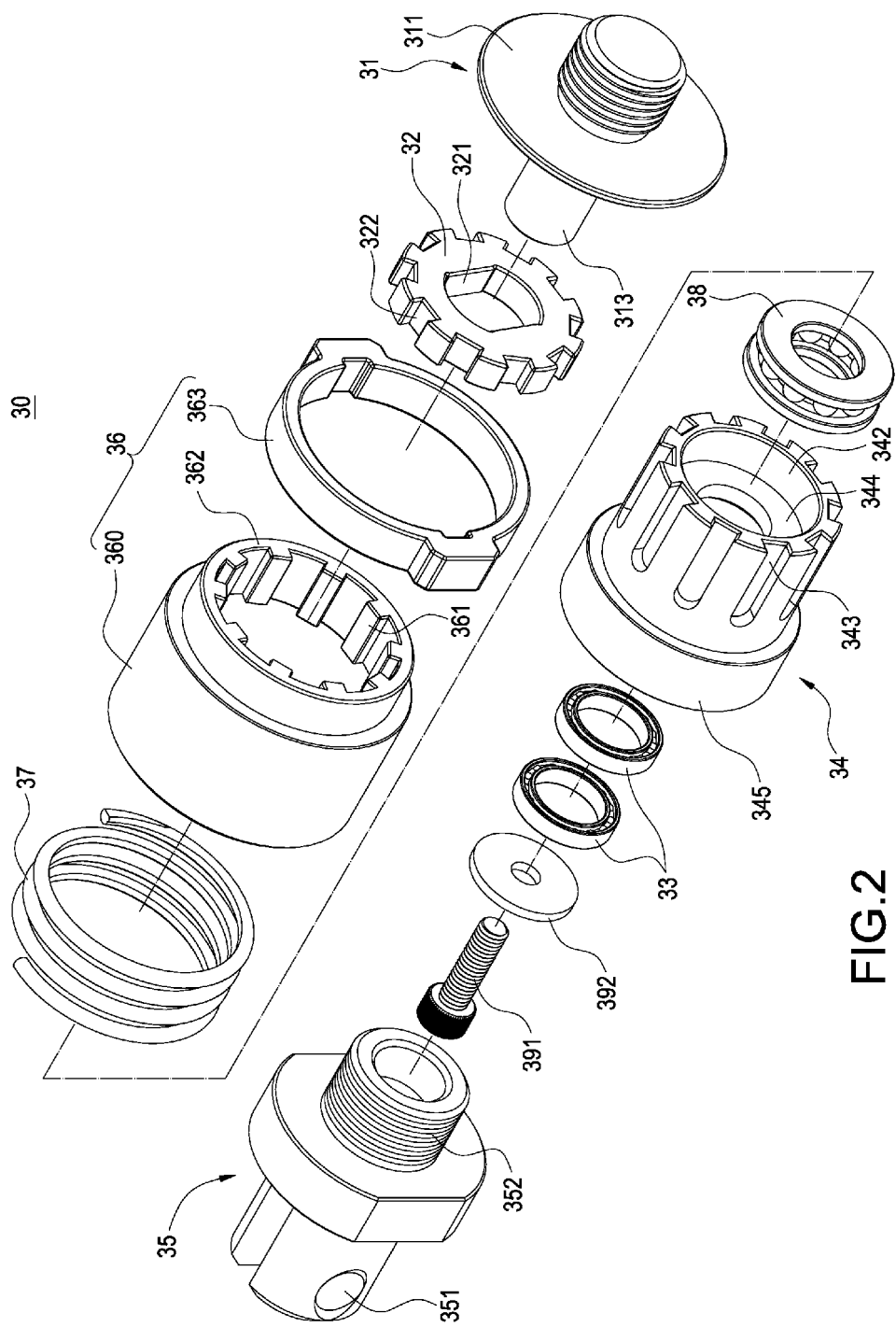
FIG. 2 is an explosive perspective view of the fast releasing mechanism of the present invention from another view.
Figure 3:
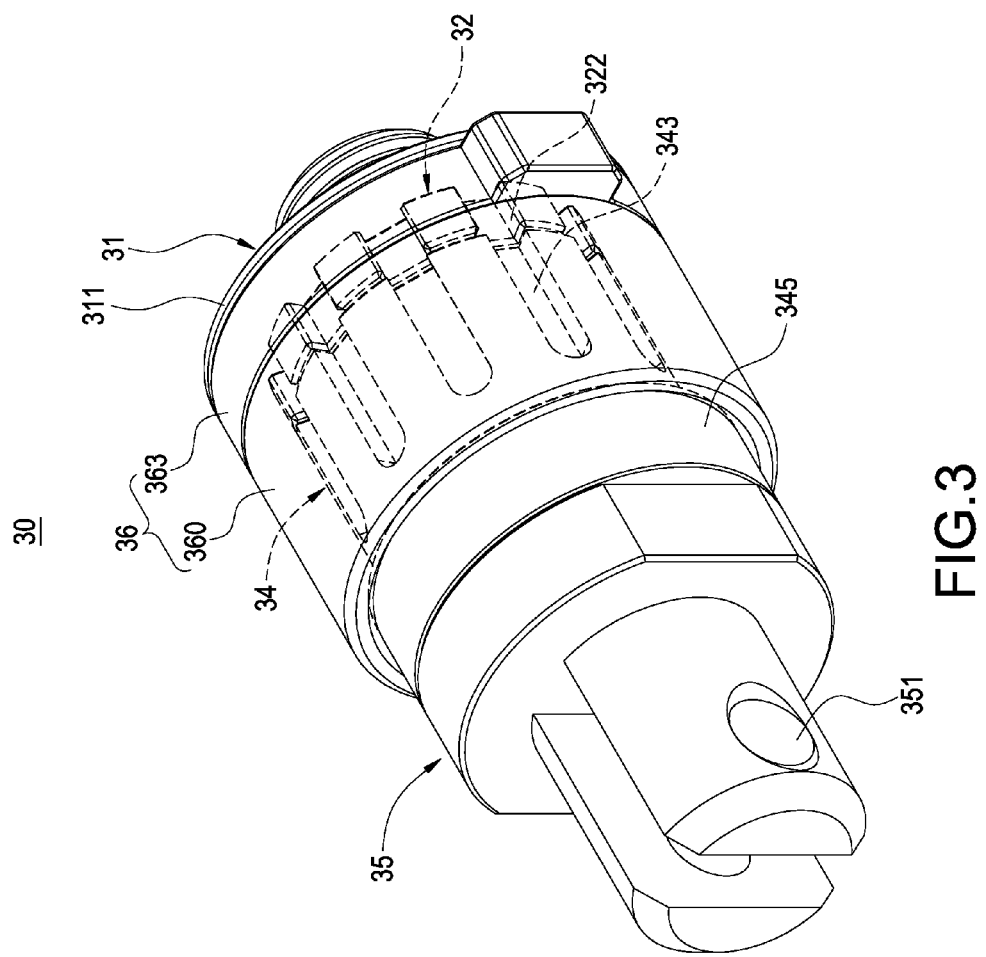
FIG. 3 is an assembly perspective view of the fast releasing mechanism of the present invention.
Figure 4:
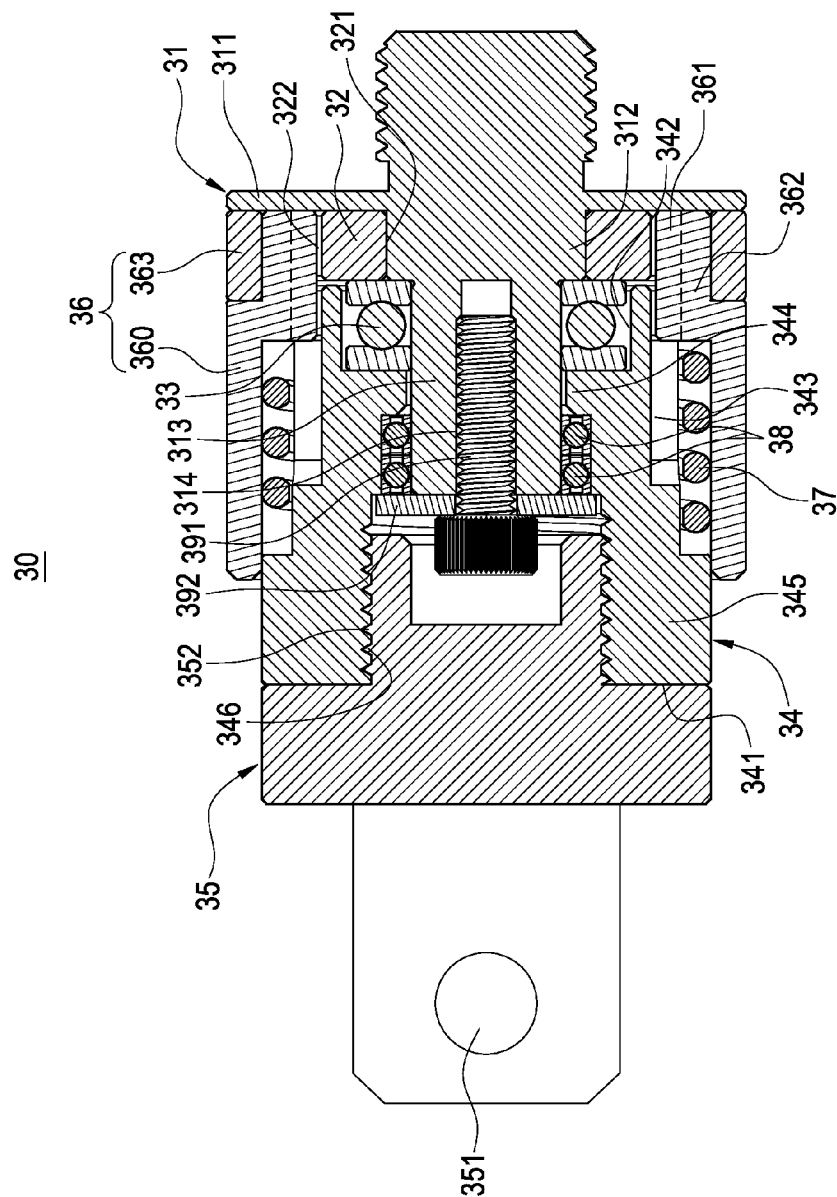
FIG. 4 is a cross-sectional schematic of the fast releasing mechanism of the present invention.
Figure 5:
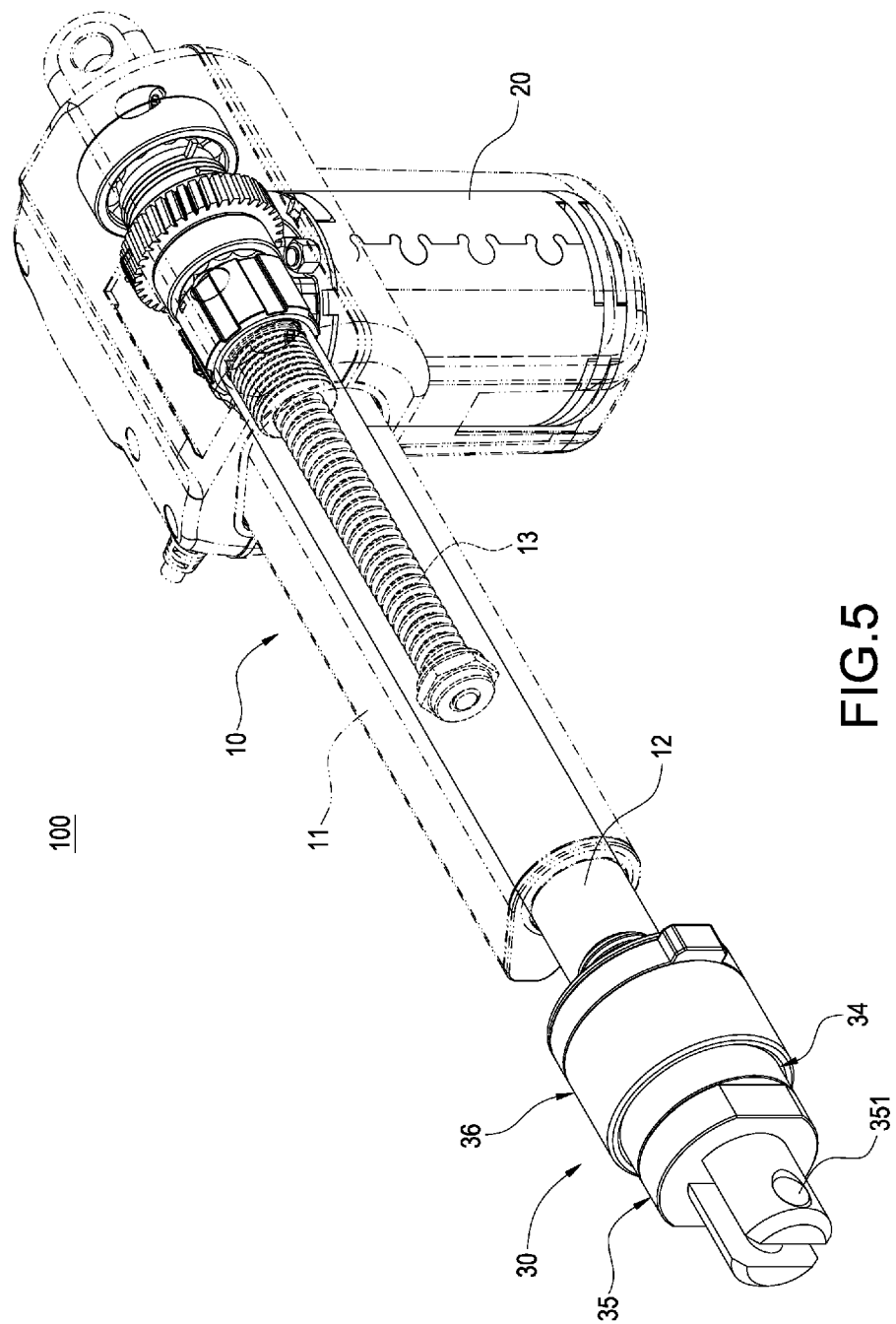
FIG. 5 is an assembly perspective view of the electric actuator of the present invention.

As shown in FIG. 5, the actuating mechanism 10 includes an external tube 11, an actuating shaft 12, and a non-self locking screw rod 13. The actuating shaft 12 which is disposed through and within the external tube 11 is hollow and the non-self locking screw rod 13 is disposed through and within the actuating shaft 12. The relative position of the non-self locking screw rod 13 to the external tube 11 is fixed.

The motor 20 connects the non-self locking screw rod 13 and drives it to rotate. One end of the actuating shaft 12 is screwed to the thread of the non-self locking screw rod 13 by means of a nut (not shown) to drive the non-self locking screw rod 13. When the non-self locking screw rod 13 rotates axially, it drives the actuating shaft 12 to move axially, in which the nut (not shown) may idle with respect to the non-self locking screw rod 13 when the nut (not shown) is under a downward pressure. The idling may be caused by a chamfer angle of the tread of the non-self locking screw rod 13 above 45 degree, or by the lubricant between the nut and the non-self locking screw rod 13.

The fast releasing mechanism 30 includes a rotary base 31, a coupling ring 32, a bearing 33, a sleeve 34, a hinge base 35, a clutch device 36, an elastic member 37, and a supporting ring 38.

One end of the rotary base 31 is connected to the actuating shaft 12. The rotary base 31 has a base body 311, a positioning post 312 extending from the base body 311, and an axial rod 313 extending axially from the positioning post 312, in which the base body 311 has a disk shape, the cross-section of the positioning post 312 has a circle-like shape, and the axial rod 313 has a cylindrical shape, but not limited to these.

The inner side of the coupling ring 32 has a positioning hole 321 matchingly sleeved around the positioning post 312, whereby the coupling ring 32 is correspondingly sleeved around and rotates with the positioning post 312. Besides, one or a plurality of locking slots 322 are disposed along the axis of the coupling ring 32 on the external peripheral wall of the coupling ring 32. The locking slots 322 are disposed evenly on the external peripheral wall of the coupling ring 32.

The bearing 33 is sleeved around the axial rod 313. Balls are disposed in the bearing 33 to decrease the rotation resistance caused by the relative rotation.

The sleeve 34 has a cylinder shaper, but not limited to this. The sleeve 34 and the coupling ring 32 are axially attached to each other. Besides, the sleeve 34 is sleeved around the axial rod 313 and the bearing 33, and the rotary base 31 can rotate with respect to the sleeve 34. Also, two ends of the sleeve 34 are a fixed end 341 and a hinge end 342. A plurality of chain slots 343 that have the same amount of the locking slots 322 are disposed on the external peripheral wall the sleeve 34; each of the chain slots 343 is parallel with the axis of the sleeve 34 and the chain slots 343 are evenly disposed on the external peripheral wall close to the hinge end 342. Further, an internal ring rib 344 protrudes from the internal wall of the sleeve 34; the bearing 33 is compressed against the internal ring rib 344 and the positioning post 312. Also, a first annulus 345 protrudes from the external periphery of the sleeve 34.

The hinge base 35 is affixed to one end of the sleeve 34 away from the coupling ring 32. In the preferred embodiment of the present invention, the hinge base 35 is affixed to the fixed end 341 of the sleeve 34 by means of thread connection, but not limited to this. The end of the hinge base 35 has at least one hinge hole 351 that is used for connection to an external object whose position level or elevation angle need to be adjusted.

The clutch device 36 has a cylinder shape, but not limited to this. The clutch device 36 is correspondingly sleeved around the sleeve 34 and the bearing 33. The raised ribs 361 that have the same amount of the chain slots 322 are disposed on the internal wall of the clutch device 36, parallel with the axis thereof. Each of the raised ribs 361 is slidably connected to the locking slots 322 and the chain slots 343. Accordingly, the sleeve 34 can be selected to move together with or move separately with the rotary base 31 by means of the axial movement of the clutch device 36. Besides, a second annulus 362 protrudes from the internal periphery of the clutch device 36; the raised ribs 361 are extended from the internal periphery of the second annulus 362 and formed. Also, the clutch device 36 includes a cylinder 360 and a fixing ring 363 sleeved around the external periphery of the cylinder 360; the raised ribs are formed in the cylinder 360.

The elastic member 37 is a helical spring, but it depends and is not limited to this in the current embodiment.

The elastic member 37 is clamped between the sleeve 34 and the clutch device 36. That is, the elastic member 37 is sleeved around the sleeve 34 and received in the clutch device 36; also, the elastic member 37 is clamped between the first annulus 345 and the second annulus 362.

The support ring 38 is sleeved around the end of the axial rod 313 and disposed between the axial rod 313 and the sleeve 34. The outer side of the supporting ring 38 is disposed against the inner wall of the sleeve 34 to support and maintain the coaxial configuration between the axial rod 313 and the sleeve 34.

Besides, the fixed end 341 of the sleeve 34 has a thread hole which correspondingly receives a screw rod 352 by means of thread connection; the screw rod 352 extends from the hinge base 35 such that the hinge base 35 is affixed to the fixed end 341. The fast releasing mechanism 30 of the present invention further includes a screw 391 and a washer 392. The axial rod 313 has a fixing hole 314. The screw 391 is correspondingly screwed in the fixing hole 314 and the washer 392 is clamped between the screw 391 and the end of the axial rod 313. The washer 392 projects radially toward the periphery of the axial rod 313 and is compressed by the supporting ring 38, whereby the fast releasing mechanism 30 has the advantage of rapid assembly.

The assembly of the electric actuator 100 of the present invention is done by the actuating mechanism 10 including the actuating shaft 12 and the non-self locking screw rod 13 screwed to the actuating shaft 12; the motor 20 connects and drives the non-self locking screw rod 13; one end of the rotary base 31 of the fast releasing mechanism 30 is connected to the actuating shaft 12, the rotary base 31 having the positing post 312 and the axial rod 313 axially extending from the positing post 312; the coupling ring 32 is correspondingly sleeved around and rotates with the positing post 312, a plurality of locking slots 322 being disposed on the external peripheral wall of the coupling ring 32; the bearing 33 is sleeved around the axial rod 313; the sleeve 34 is sleeved around the axial rod 313 and the bearing 33; the rotary base 31 can rotate with respect to the sleeve 34; a plurality of chain slots 343 that communicate with the locking slots 322 are disposed on the external peripheral wall the sleeve 34; the clutch device 36 is correspondingly sleeved around the sleeve 34 and the bearing 33; the raised ribs 361 slidably connected to the locking slots 322 and the chain slots 343 are disposed on the internal wall of the clutch device 36, whereby the sleeve 34 can be selected to move together with or move separately with the rotary base 31 by means of the axial movement of the clutch device 36.

The assembly of the fast releasing mechanism 30 of the present invention is done by the rotary based 31 having a positing post 312 and an axial rod 313 axially extending from the positing post 312; the coupling ring 32 is correspondingly sleeved around and rotates with the positing post 312; the locking slots 322 being disposed on the external peripheral wall of the coupling ring 32; the bearing 33 is sleeved around the axial rod 313; the sleeve 34 is sleeved around the axial rod 313 and the bearing 33; the rotary base 31 can rotate with respect to the sleeve 34; the chain slots 343 that communicate with the locking slots 322 are disposed on the external peripheral wall the sleeve 34; the clutch device 36 is correspondingly sleeved around the sleeve 34 and the bearing 33; the raised ribs 361 slidably connected to the locking slots 322 and the chain slots 343 are disposed on the internal wall of the clutch device 36, whereby the sleeve 34 can be selected to move together with or move separately with the rotary base 31 by means of the axial movement of the clutch device 36.

Figure 6:
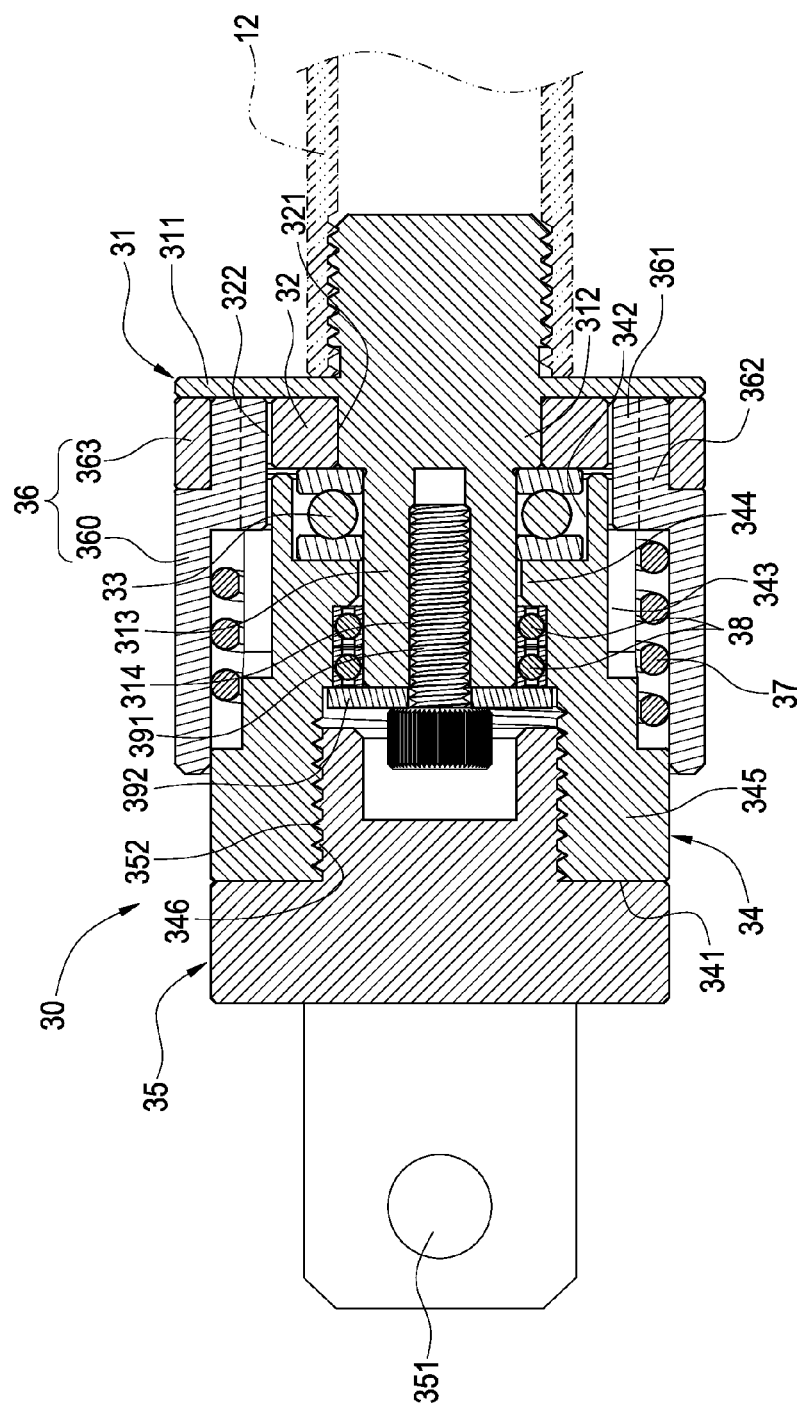
FIG. 6 is a schematic of the electric actuator of the present invention in a locked state.
Figure 7:
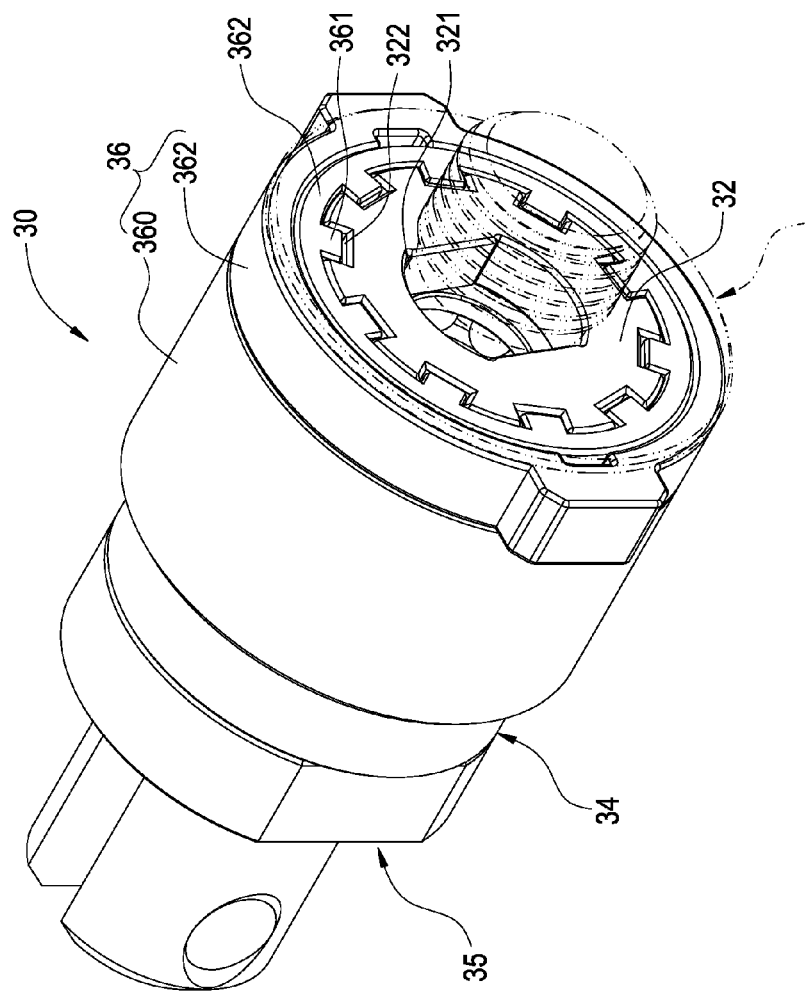
FIG. 7 is another schematic of the electric actuator of the present invention in the locked state.

Please refer to FIGS. 6-9 showing different states of operation of the electric actuator of the present invention. As shown in FIGS. 5-7, when the fast releasing mechanism 30 is in a locked state, two ends of the respective raised rib 361 of the clutch device 36 are snapped into the corresponding locking slot 322 and the chain slot 344. Thus, the clutch device 36 is locked by the coupling ring 32 and can not rotate axially. As a result, the mutual rotation of the sleeve 34 and the rotary base 31 is prevented; meanwhile, the actuating shaft 12 is fixed and confined through the rotary base 31. At this moment, the motor 20 is required to drive the non-self locking screw rod 13 to rotate and makes the actuating shaft 12 move axially with respect to the non-self locking screw rod 13.

Figure 8:
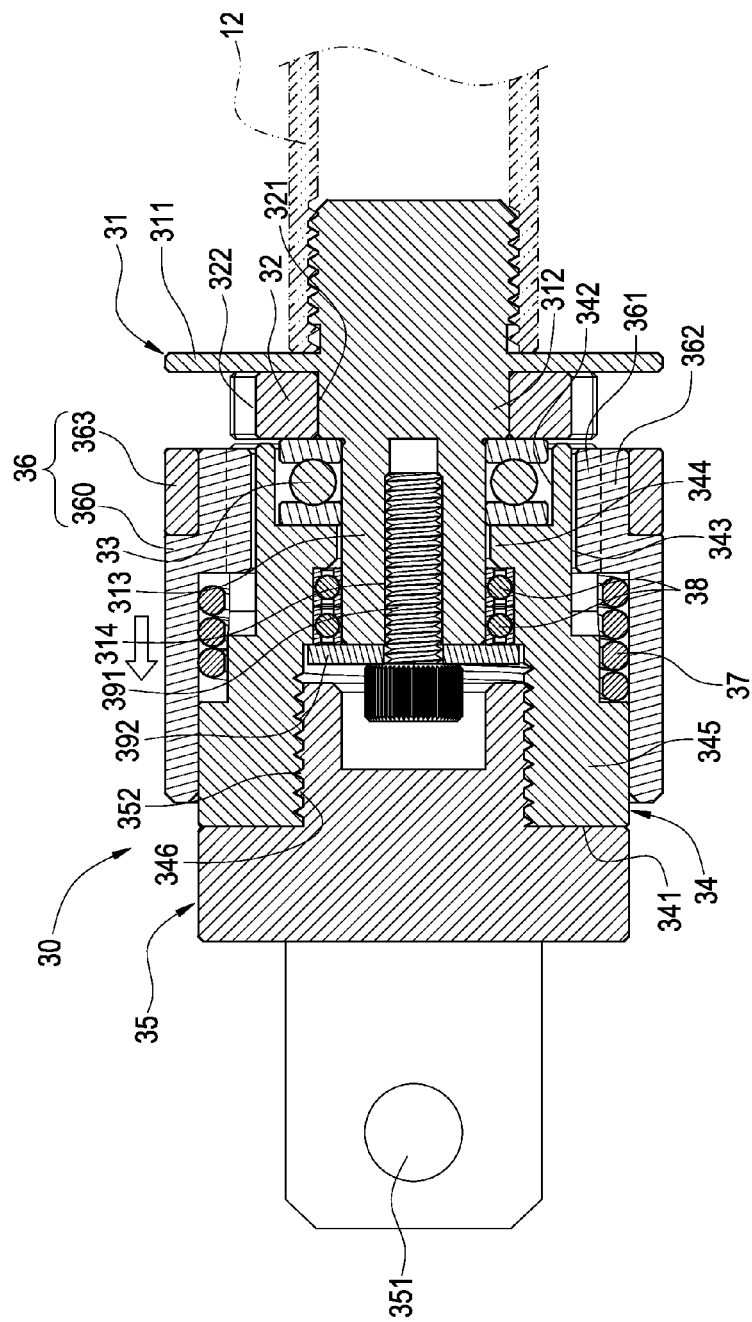
FIG. 8 is a schematic of the electric actuator of the present invention in a releasing state.
Figure 9:
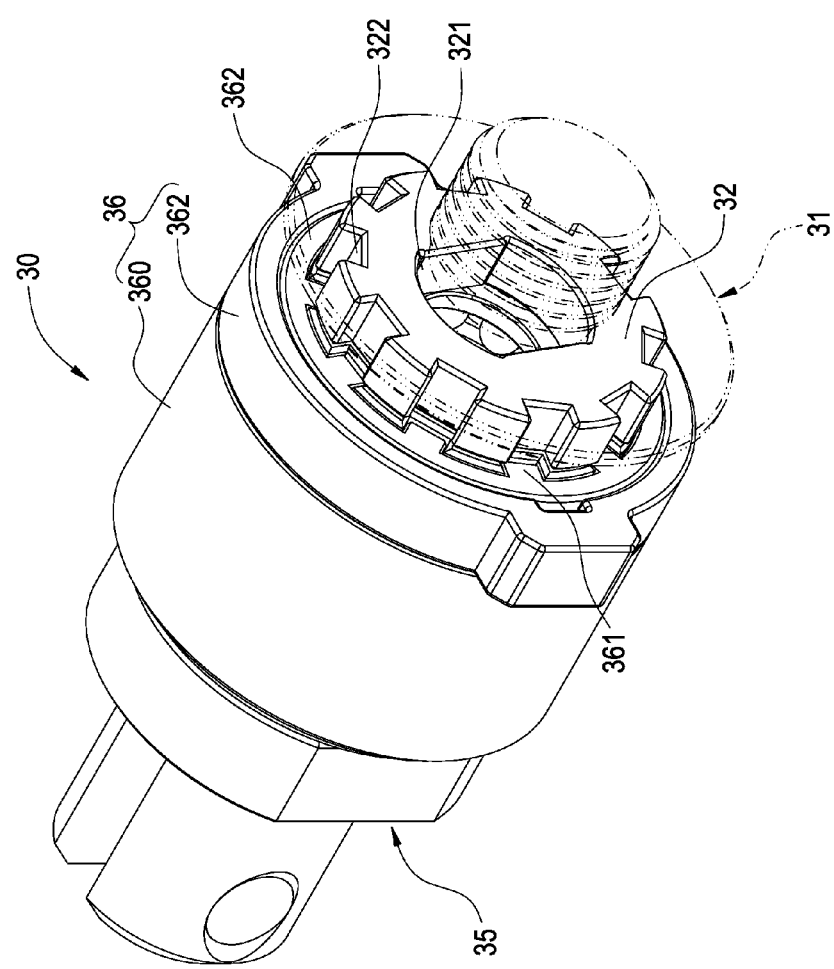
FIG. 9 is another schematic of the electric actuator of the present invention in the releasing state.

As shown in FIGS. 5, 8, and 9, when the clutch device 36 slides away from the rotary base 31, the fast releasing mechanism 30 is in a releasing state. One end of each raised rib 361 of the clutch device 36 is completely released out of the corresponding locking slot 322. The clutch device 36 is not locked by the coupling ring 32, resulting in the sleeve 34 being able to rotate with respect to the rotary base 31. That is, the actuating shaft 12 can rotate with respect to the sleeve 34. At this moment, the actuating shaft is under compression; that is, the nut (not shown) is under a downward pressure and the nut (not shown) idles with respect to the non-self locking screw rod 13 such that the electric actuator 100 can make the actuating shaft move axially with respect to the non-self locking screw rod without through the motor 20. Accordingly, the electric actuator can perform the rapid position restoration to reduce the time for position restoration of the electric actuator.

Besides, the bearing 33 is sleeved around the axial rod 313 and clamped between the sleeve 34 and the rotary base 31. Balls disposed in the bearing 33 can decrease the rotation resistance caused by the relative rotation of the sleeve 34 to the rotary base 31.

Also, the fast releasing mechanism 30 further includes the elastic member 37 clamped between the sleeve 34 and the clutch device 36, whereby when the clutch device 36 slides away from the rotary base 31, the elastic member 37 pushes against and restores the clutch device 36 toward the rotary base 31, exerting a steady force on the clutch device 36 (e.g., manually sliding the clutch device 36 away from the rotary base 31). Thus, the fast releasing mechanism stays in a releasing state, and which further increases the operational security or is used to adjust the releasing time of the fast releasing mechanism 30.

Moreover, the fast releasing mechanism 30 further includes the supporting ring 38 disposed between the axial rod 313 and the sleeve 34. The outer side of the supporting ring 38 is disposed against the inner wall of the sleeve 34 to support and maintain the coaxial configuration between the axial rod 313 and the sleeve 34, whereby when the axial rod 313 rotates with respect to the sleeve 34, the supporting ring 38 can lessen the mutual impact of the axial rod 313 and the sleeve 34 to avoid the deflection or error of movement of the electric actuator 100.

Figure 10:
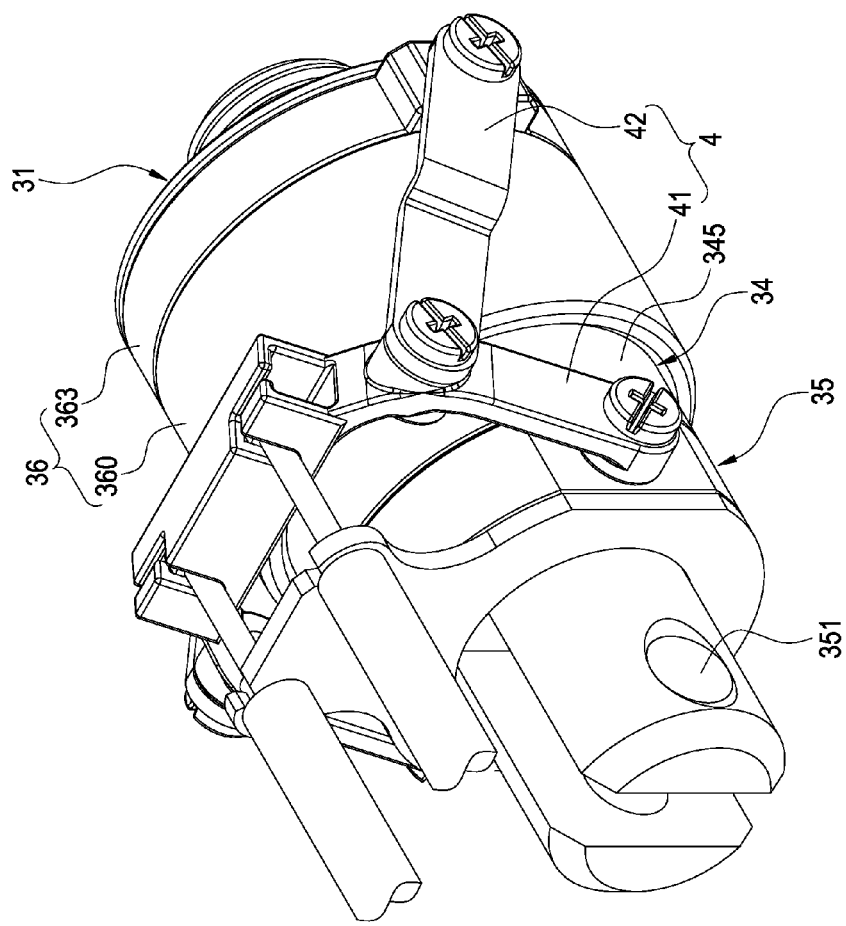
FIG. 10 is an assembly perspective view of the fast releasing mechanism according to another embodiment of the present invention.
Figure 11:
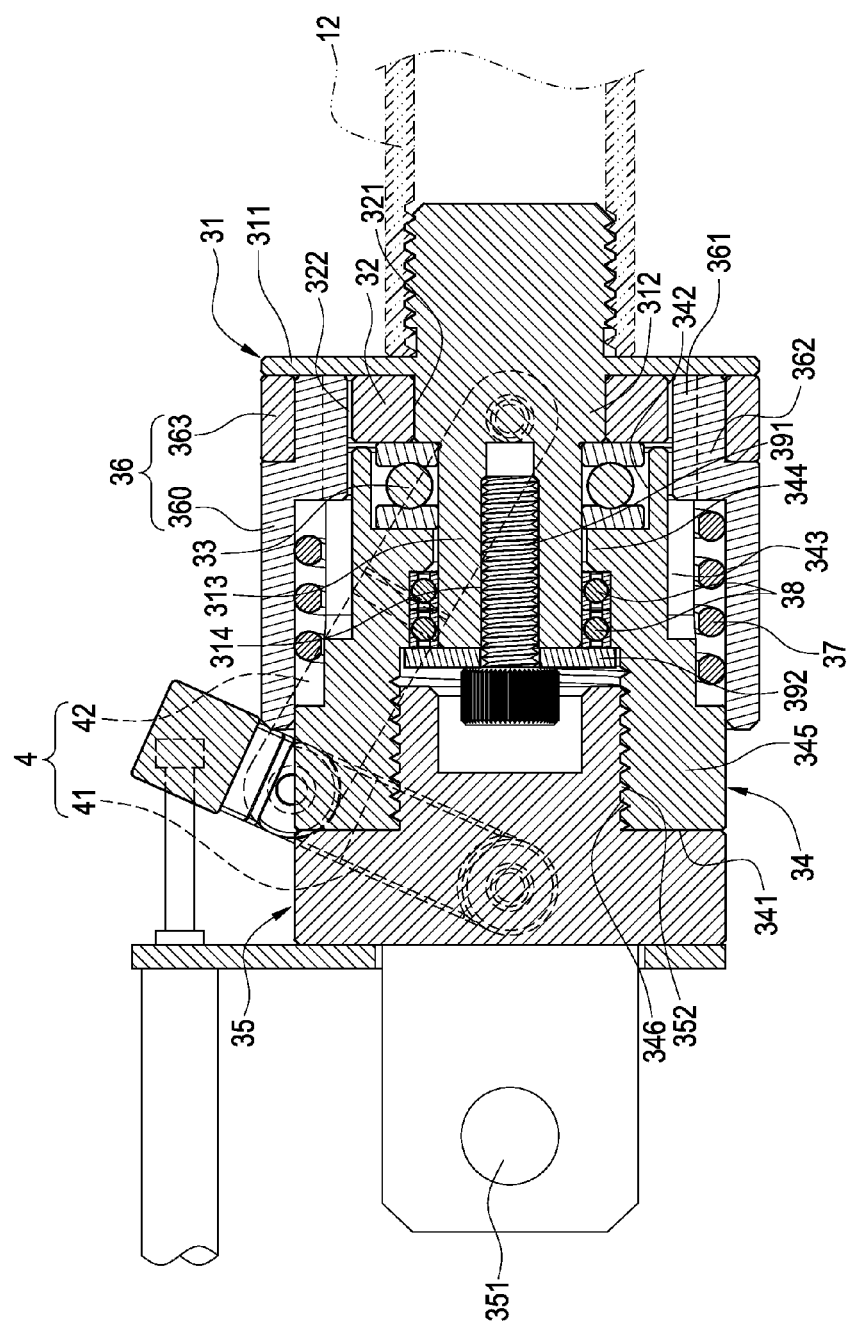
FIG. 11 is an assembly perspective view of the fast releasing mechanism according to another embodiment of the present invention in an operational state.
Figure 12:
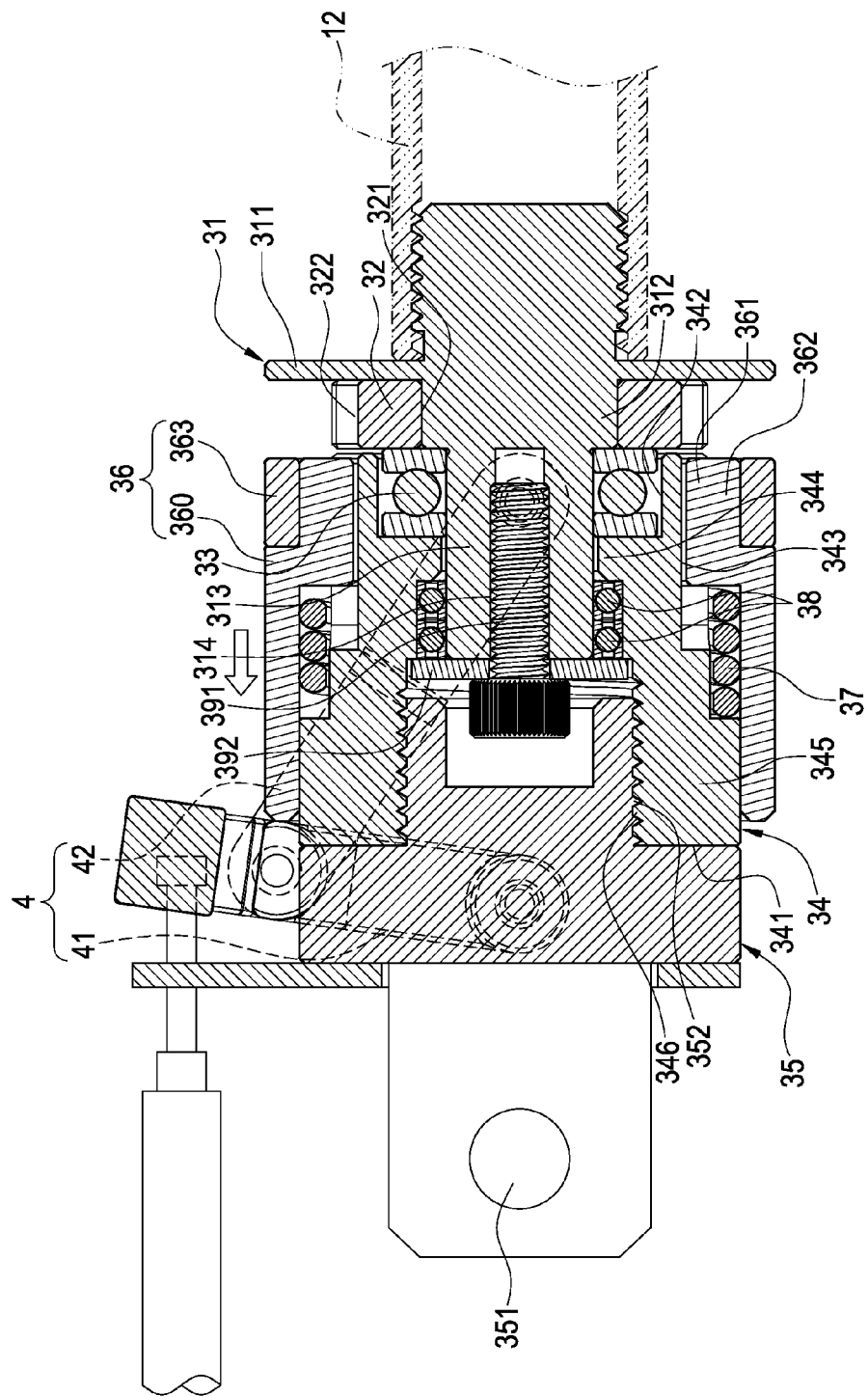
FIG. 12 is an assembly perspective view of the fast releasing mechanism according to another embodiment of the present invention in another operational state.

Please refer to FIGS. 10 and 11, which show the fast releasing mechanism according to another embodiment of the present invention. The fast releasing mechanism 30 further includes a switch member 4 having a lever 41 and at least one linkage rod 42. The lever 41 is hinged to the hinge base 35. One end of the linkage rod 42 is hinged to the clutch device 36; the other end of the linkage rod 42 is hinged to the lever 41 such that when the lever 41 is actuated away from the rotary base 31, the linkage rod 42 will move the clutch device 36 toward the hinge base 35 to make the fast releasing mechanism 30 in the releasing state, in which the switch member 4 can be manually actuated by the user or can be automatically actuated by an external device coupled to the lever 41.

Further explanation is provided below. The clutch device 36 includes the cylinder 360 and the fixing ring 363 sleeved around the external periphery of the cylinder 360. One end of the linkage rod 42 is hinged to the clutch device 36.

Thus, the fast releasing mechanism 30 further includes a switch member 4 which can facilitate the switching of locking and releasing performed by the fast releasing mechanism 30, improving the use convenience.

Summarizing the above description, the electric actuator and the fast releasing mechanism thereof of the present invention which can achieve the expected objectives and overcome the disadvantages of the related art is novel, useful, and non-obvious. Please examine the application carefully and grant it as a formal patent for protecting the rights of the inventor.

What is claimed is:

1. An electric actuator, comprising:
   an actuating mechanism (10) including an actuating shaft (12) and a non-self locking screw rod (13) screwed to the actuating shaft (12);
   a motor (20) connecting and driving the non-self locking screw rod (13); and
   a fast releasing mechanism (30) including:
   a rotary base (31), one end thereof being connected to the actuating shaft (12), the rotary base (31) having a positing post (312) and an axial rod (313) axially extending from the positing post (312);
   a coupling ring (32) correspondingly sleeved around and rotating with the positing post (312), a plurality of locking slots (322) being disposed on the external peripheral wall of the coupling ring (32);
   a bearing (33) sleeved around the axial rod (313);
   a sleeve (34) sleeved around the axial rod (313) and the bearing (33), wherein the rotary base (31) rotates with respect to the sleeve (34) and a plurality of chain slots (343) that communicate with the locking slots (322) are disposed on the external peripheral wall the sleeve (34); and
   a clutch device (36) correspondingly sleeved around the sleeve (34) and the bearing (33), wherein a plurality of raised ribs (361) slidably connected to the locking slots (322) and the chain slots (343) are disposed on the internal wall of the clutch device (36), whereby the sleeve (34) can be selected to move together with or move separately with the rotary base (31) by means of the axial movement of the clutch device (36).

2. The electric actuator according to claim 1, wherein the fast releasing mechanism (30) further includes a support ring (38) disposed between the axial rod (313) and the sleeve (34).

3. The electric actuator according to claim 1, wherein the fast releasing mechanism (30) further includes an elastic member (37) clamped between the sleeve (34) and the clutch device (36).

4. The electric actuator according to claim 3, wherein a first annulus (345) protrudes from the external periphery of the sleeve (34) and a second annulus (362) protrudes from the internal periphery of the clutch device (36), wherein the elastic member (37) is clamped between the first annulus (345) and the second annulus (362).

5. The electric actuator according to claim 4, wherein the raised ribs (361) are extended from the internal periphery of the second annulus (362) and formed.

6. The electric actuator according to claim 1, wherein the fast releasing mechanism (30) further includes a hinge base (35) affixed to one end of the sleeve (34) away from the coupling ring (32).

7. The electric actuator according to claim 6, wherein the fast releasing mechanism (30) further includes a switch member (4) having a lever (41) and at least one linkage rod (42), the lever (41) hinged to the hinge base (35), one end of the linkage rod (42) hinged to the clutch device (36), the other end of the linkage rod (42) hinged to the lever (41).

8. The electric actuator according to claim 7, wherein the clutch device (36) includes a cylinder (360) and a fixing ring (363) sleeved around the external periphery of the cylinder (360), wherein one end of the linkage rod (42) is hinged to the clutch device (36) and the raised ribs (361) are formed in the cylinder (360).

9. The electric actuator according to claim 1, wherein an internal ring rib (344) protrudes from the internal wall of the sleeve (34), wherein the bearing (33) is compressed against the internal ring rib (344) and the positioning post (312).

10. The electric actuator according to claim 1, wherein the inner side of the coupling ring (32) has a positioning hole (321) matchingly sleeved around the positioning post (312).

11. A fast releasing mechanism for an electric actuator, including:
    a rotary based (31) having a positing post (312) and an axial rod (313) axially extending from the positing post (312);
    a coupling ring (32) correspondingly sleeved around and rotating with the positing post (312), a plurality of locking slots (322) being disposed on the external peripheral wall of the coupling ring (32);
    a bearing (33) sleeved around the axial rod (313);
    a sleeve (34) sleeved around the axial rod (313) and the bearing (33), wherein the rotary base (31) rotates with respect to the sleeve (34) and a plurality of chain slots (343) that communicate with the locking slots (322) are disposed on the external peripheral wall the sleeve (34); and
    a clutch device (36) correspondingly sleeved around the sleeve (34) and the bearing (33), wherein a plurality of raised ribs (361) slidably connected to the locking slots (322) and the chain slots (343) are disposed on the internal wall of the clutch device (36), whereby the sleeve (34) can be selected to move together with or move separately with the rotary base (31) by means of the axial movement of the clutch device (36).

12. The fast releasing mechanism according to claim 11, wherein the fast releasing mechanism (30) further includes a support ring (38) disposed between the axial rod (313) and the sleeve (34).

13. The fast releasing mechanism according to claim 11, wherein the fast releasing mechanism (30) further includes an elastic member (37) clamped between the sleeve (34) and the clutch device (36).

14. The fast releasing mechanism according to claim 13, wherein a first annulus (345) protrudes from the external periphery of the sleeve (34) and a second annulus (362) protrudes from the internal periphery of the clutch device (36), wherein the elastic member (37) is clamped between the first annulus (345) and the second annulus (362).

15. The fast releasing mechanism according to claim 14, wherein the raised ribs (361) are extended from the internal periphery of the second annulus (362) and formed.

16. The fast releasing mechanism according to claim 11, wherein the fast releasing mechanism (30) further includes a hinge base (35) affixed to one end of the sleeve (34) away from the coupling ring (32).

17. The fast releasing mechanism according to claim 16, wherein the fast releasing mechanism (30) further includes a switch member (4) having a lever (41) and at least one linkage rod (42), the lever (41) hinged to the hinge base (35), one end of the linkage rod (42) hinged to the clutch device (36), the other end of the linkage rod (42) hinged to the lever (41).

18. The fast releasing mechanism according to claim 17, wherein the clutch device (36) includes a cylinder (360) and a fixing ring (363) sleeved around the external periphery of the cylinder (360), wherein one end of the linkage rod (42) is hinged to the clutch device (36) and the raised ribs (361) are formed in the cylinder (360).

19. The fast releasing mechanism according to claim 11, wherein an internal ring rib (344) protrudes from the internal wall of the sleeve (34), and wherein the bearing (33) is compressed against the internal ring rib (344) and the positioning post (312).

20. The fast releasing mechanism according to claim 11, wherein the inner side of the coupling ring (32) has a positioning hole (321) matchingly sleeved around the positioning post (312).

* * * * *